(12) United States Patent
Sakai et al.

(10) Patent No.: US 7,587,840 B2
(45) Date of Patent: Sep. 15, 2009

(54) DIMENSION MEASURING APPARATUS AND DIMENSION MEASURING METHOD

(75) Inventors: Yoshito Sakai, Tokyo (JP); Tamotsu Ashida, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 41 days.

(21) Appl. No.: 12/078,125

(22) Filed: Mar. 27, 2008

(65) Prior Publication Data

US 2008/0235971 A1    Oct. 2, 2008

(30) Foreign Application Priority Data

Mar. 29, 2007    (JP) ............................. 2007-087679

(51) Int. Cl.
*G01B 5/06* (2006.01)

(52) U.S. Cl. ..................... 33/702; 33/501.02
(58) Field of Classification Search .............. 33/501.02, 33/501.03, 702, 704, 710
See application file for complete search history.

(56) References Cited

U.S. PATENT DOCUMENTS

| | | | | |
|---|---|---|---|---|
| 4,271,699 A | * | 6/1981 | Williamson | 73/159 |
| 4,569,024 A | * | 2/1986 | Reichert et al. | 33/DIG. 21 |
| 4,912,856 A | * | 4/1990 | Ernst | 33/702 |
| 6,247,241 B1 | * | 6/2001 | Hashimoto | 33/704 |
| 6,588,118 B2 | * | 7/2003 | Hellstrom | 33/501.02 |
| 6,725,557 B2 | * | 4/2004 | Kushibiki et al. | 33/832 |
| 6,729,757 B2 | * | 5/2004 | Faure et al. | 33/533 |
| 6,844,720 B1 | * | 1/2005 | Pokrywka | 33/702 |
| RE39,037 E | * | 3/2006 | Obama et al. | 33/501.03 |
| 2007/0180724 A1 | * | 8/2007 | Pucher et al. | 33/706 |

FOREIGN PATENT DOCUMENTS

JP    09-113202    5/1997

* cited by examiner

*Primary Examiner*—G. Bradley Bennett
(74) *Attorney, Agent, or Firm*—Rabin & Berdo, PC

(57) ABSTRACT

A dimension measuring apparatus 1 which measures a dimension of a measurement subject 2 includes a conveying device 5 which convey the measurement subject 2, a temperature controlling device which control the temperature in a conveyance region 10, 11 to which the measurement subject 2 is conveyed, a dimension measuring device 15 which measure the dimension of the measurement subject 2 conveyed to a measurement portion 6 in the conveyance region 10, 11, and a temperature measuring device 14 which measure the temperature of the measurement subject 2 during dimension measurement by the dimension measuring device 15. The dimension of the measurement subject 2 measured by the dimension measuring device 15 is corrected to a dimension at a predetermined reference temperature using the temperature measured by the temperature measuring device 14.

9 Claims, 2 Drawing Sheets

US 7,587,840 B2

DIMENSION MEASURING APPARATUS AND DIMENSION MEASURING METHOD

TECHNICAL FIELD OF THE INVENTION

This invention relates to a dimension measuring apparatus and a dimension measuring method for measuring a dimension of a measurement subject.

DESCRIPTION OF RELATED ART

Typically, a measurement subject (product) is measured in a factory. When measurement of the measurement subject is performed in a factory, the temperature of the measurement subject varies according to the temperature in the factory, and therefore errors may occur in the measurement value depending on the temperature in the factory at the time of measurement (JP9-113202A).

SUMMARY OF THE INVENTION

When a measurement subject is measured regardless of temperature in this manner, it is impossible to evaluate the dimensional precision of the measurement subject accurately.

This invention has been designed in consideration of this problem, and it is an object thereof to provide a dimension measuring apparatus and a dimension measuring method with which the dimensional precision of a measurement subject can be evaluated accurately.

In order to achieve above object, this invention provides a dimension measuring apparatus which measures a dimension of a measurement subject. The dimension measuring apparatus comprises a conveying device which convey the measurement subject, a temperature controlling device which control a temperature in a conveyance region to which the measurement subject is conveyed a dimension measuring device which measure the dimension of the measurement subject conveyed to a measurement portion in the conveyance region and a temperature measuring device which measure a temperature of the measurement subject during dimension measurement by the dimension measuring device, wherein the dimension of the measurement subject measured by the dimension measuring device is corrected to a dimension at a predetermined reference temperature using the temperature measured by the temperature measuring device.

PREFERRED EMBODIMENTS OF THE INVENTION

An embodiment of this invention will be described below with reference to the drawings.

Figure 1:
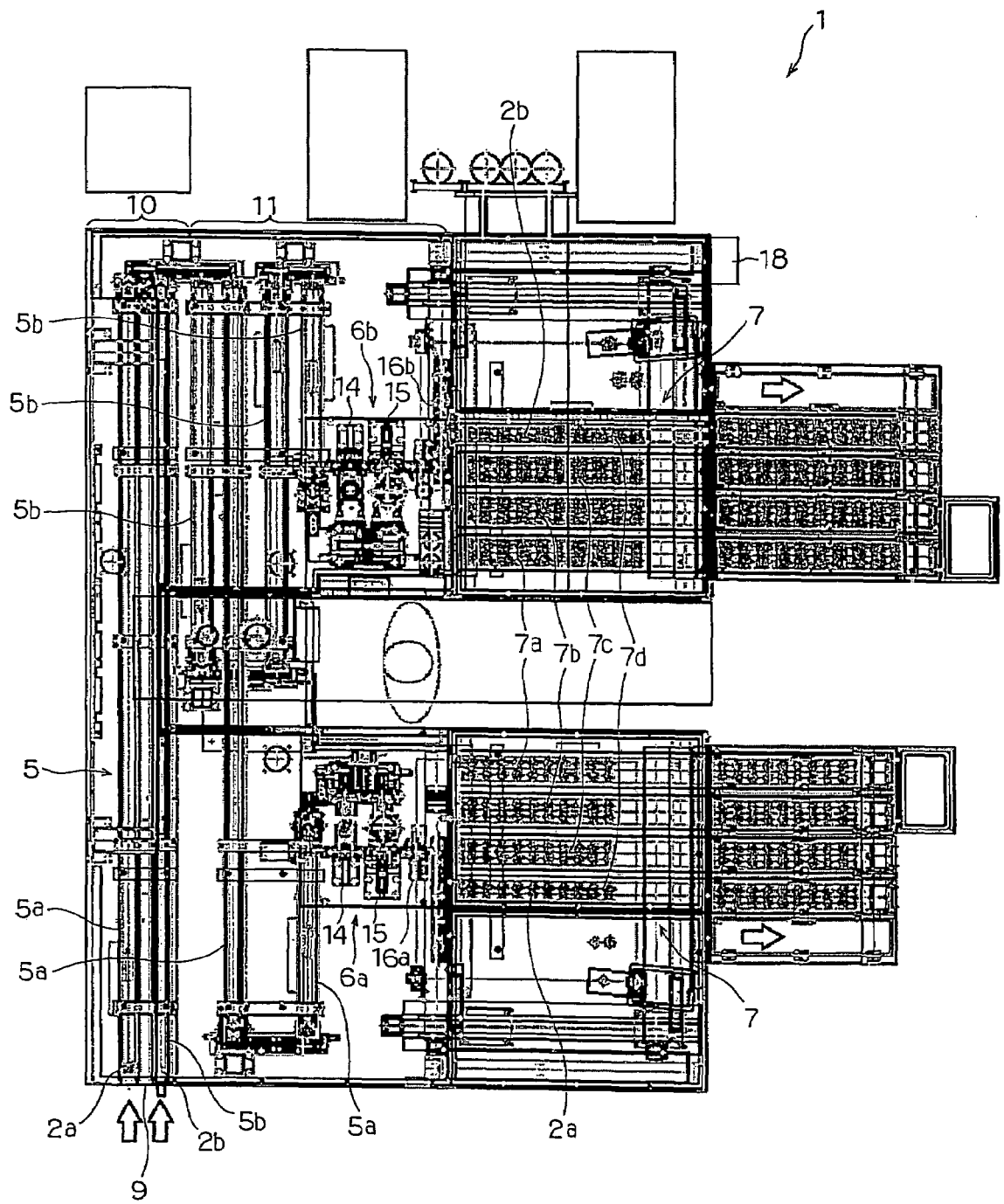
FIG. 1 is a plan view showing a dimension measuring apparatus according to an embodiment of this invention.
Figure 2:
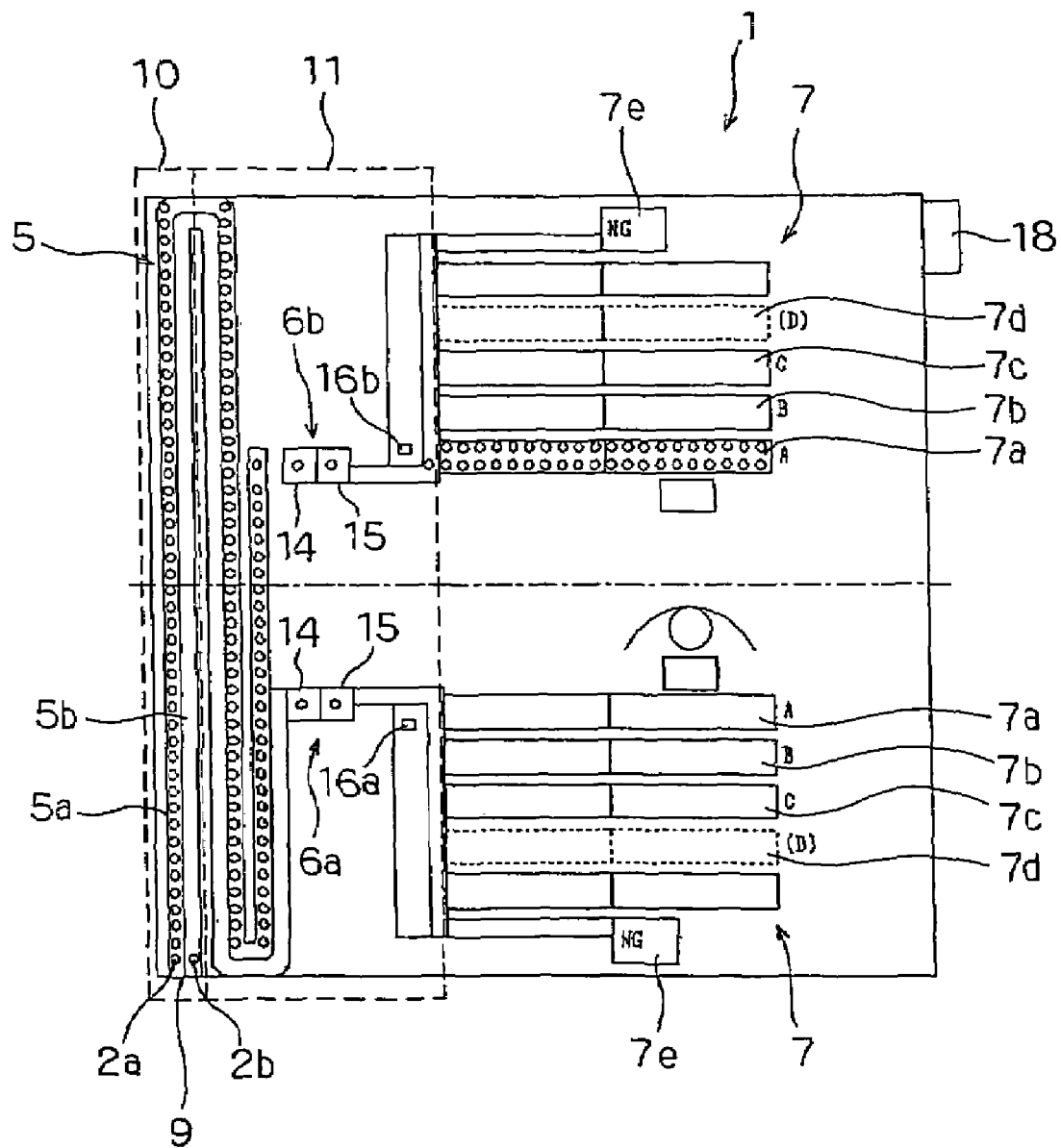
FIG. 2 is a pattern diagram showing in pattern form the dimension measuring apparatus of FIG. 1.

Referring to FIGS. 1 and 2, a dimension measuring apparatus 1 according to an embodiment of this invention will be described.

The dimension measuring apparatus 1 is an apparatus that measures a dimension of a work piece (measurement subject) and evaluates the dimensional precision of the work piece.

The work piece of this embodiment is a rotor 2a that holds a vane in a vane pump, and a cam ring 2b accommodating the rotor 2a. Hereafter, the rotor 2a and cam ring 2b will occasionally be referred to together as a work piece 2.

The dimension measuring apparatus 1 comprises a conveyor 5 (conveying device) that conveys the work piece 2, a measurement portion 6 (6a, 6b) that measures the dimension and temperature of the work piece 2, and a storage portion 7 that stores work pieces 2 sorted according to dimensional precision.

The work piece 2 is washed in warm water by a washing machine (not shown) disposed in the vicinity of the dimension measuring apparatus 1 before being introduced into the dimension measuring apparatus 1, and then introduced to the conveyor 5 through an inlet portion 9. The conveyor 5 conveys the rotor 2a and cam ring 2b to the measurement portion 6 separately, and is constituted by a first conveyor 5a that conveys the rotor 2a and a second conveyor 5b that conveys the cam ring 2b.

The conveyor 5 and measurement portion 6 are housed in a conveyance region, which is a closed space. As shown in FIG. 2, the conveyance region is divided into a cooling region 10 for forcibly cooling the work piece 2 after it is introduced to the conveyor 5 through the inlet portion 9, and a harmonizing region 11 for harmonizing the temperature of the work piece 2 cooled in the cooling region 10.

As shown in FIG. 1, the first conveyor 5a and second conveyor 5b extend in parallel from the inlet portion 9 to an end portion in the cooling region 10, turn back at the end portion, and then extend into the harmonizing region 11. In the harmonizing region 11, the first conveyor 5a extends to an opposite end portion, and then turns back at the opposite end portion and extends to a measurement portion 6a which measures the rotor 2a. The second conveyor 5b, meanwhile, turns back near the center of the harmonizing region 11, turns back again at the end portion, and then extends to a measurement portion 6b which measures the cam ring 2b.

Thus, the first conveyor 5a and second conveyor 5b are formed to meander through the cooling region 10 and the harmonizing region 11.

In the cooling region 10, temperature control is performed by a cooling fan (not shown) that blows cold air from an upstream side of the conveyor 5 toward a downstream side (temperature controlling device). Specifically, the temperature in the cooling region 10 is controlled to approximately 20° C. by the cooling fan.

It should be noted that when a method of blowing cool air from the upstream side of the conveyor 5 toward the downstream side is employed, the work piece 2 is cooled rapidly on the upstream side but is not cooled easily on the downstream side. Hence, by disposing another cooling fan near the midstream of the conveyor 5 in the cooling region 10 such that this cooling fan receives the air blown by the upstream-side cooling fan and blows cold air back toward the downstream side, the work piece 2 can be cooled efficiently.

In the harmonizing region 11, temperature control is performed by a temperature adjusting fan (not shown) that takes in the air in the harmonizing region 11 and blows out temperature-adjusted air into the harmonizing region 11 (temperature controlling device). Specifically, the temperature in the harmonizing region 11 is controlled to approximately 22° C. by the temperature adjusting fan.

Hence, the work piece 2 is raised to approximately 40 to 50° C. by the washing machine, cooled rapidly to approximately 20° C. while moving through the cooling region 10, and then harmonized to a stable state of approximately 22° C. while moving through the harmonizing region 11.

Further, since the first conveyor 5a and second conveyor 5b are formed in meandering form, the work piece 2 takes time to advance through the cooling region 10 and harmonizing region 11, and therefore it is easy to control the work piece 2 to the respective temperatures set in the cooling region 10 and harmonizing region 11. In particular, when unevenness occurs in the temperature of the work piece 2 as a result of rapid cooling of the work piece 2 in the cooling region 10, the amount by which the work piece 2 contracts due to the rapid cooling differs from location to location. In such a case, however, the unevenness in the temperature of the work piece 2 is gradually eliminated during its advancement through the harmonizing region 11 such that by the time the work piece 2 reaches the measurement portion 6, both the temperature and the shape of the work piece 2 are stable.

The measurement portion 6a and the measurement portion 6b for measuring the rotor 2a and cam ring 2b conveyed by the conveyor 5 comprise a temperature measurement portion 14 (temperature measuring device) that measures the temperature of the work piece 2, and a dimension measurement portion 15 (dimension measuring device) that measures a dimension of the work piece 2. Further, a rotor master 16a (reference material) that serves as a reference when evaluating the dimensional precision of the rotor 2a is disposed in the measurement portion 6a, while a cam ring master 16b (reference material) that serves as a reference when evaluating the dimensional precision of the cam ring 2b is disposed in the measurement portion 6b. Hereafter, the rotor master 16a and cam ring master 16b will occasionally be referred to together as a master 16. It should be noted that the temperature measurement portion 14, dimension measurement portion 15, and master 16 are all disposed in the harmonizing region 11.

In the temperature measurement portion 14, the temperature of the work piece 2 is measured using a contact-type thermometer such as a thermocouple.

In the dimension measurement portion 15, the dimension of the work piece 2 is measured with the work piece 2 positioned such that the measurement location is identical in all of the work pieces 2. In this embodiment, the thickness of the rotor 2a and cam ring 2b is measured. A method of measuring the dimension of the work piece 2 will be described later.

The temperature and dimension (thickness) of the master 16 are also measured, and the measured temperature and dimension serve respectively as a reference temperature and a reference dimension when evaluating the dimensional precision of the work piece 2. When the model of the work piece 2 is changed, the master 16 is changed to a master corresponding to the new model, and the reference temperature and reference dimension of the changed master are measured. Further, when work pieces 2 of the same model are measured continuously, the reference temperature and reference dimension of the master 16 are measured anew at the time a predetermined condition is satisfied. Examples of the predetermined condition include a case in which a predetermined time period has elapsed following the previous measurement and a case in which the temperature difference between the measured temperature of the work piece 2 and the reference temperature of the master 16 is equal to or greater than a predetermined value.

Once the dimensional precision of the work piece 2 has been evaluated on the basis of the reference temperature and reference dimension of the master 16, the work piece 2 is sorted into rank on the basis of the evaluation result and stored in the storage portion 7.

When the dimension difference between the measured dimension of the work piece 2 and the reference dimension of the master 16 is within an allowable tolerance, the work piece 2 is classified into one of a total of four ranks extending from a rank A, in which the dimension difference is within the smallest range, to a rank D, in which the dimension difference is within the largest range.

The storage portion 7 comprises a first storage portion 7a, a second storage portion 7b, a third storage portion 7c, and a fourth storage portion 7d, which store work pieces 2 in rank A, rank B, rank C and rank D, respectively, and a fifth storage portion 7e which stores defective work pieces 2 in which the dimension difference between the measured dimension and the reference dimension of the master 16 is outside of the allowable tolerance. It should be noted that sorting of the work pieces 2 from the dimension measurement portion 15 to the storage portion 7 is performed automatically by a robot hand (not shown) that grips the work piece 2 directly.

After being sorted according to dimensional precision, the rotor 2a and cam ring 2b are conveyed to an assembly process in which components of equal rank, for example a rank A rotor 2a and a rank A cam ring 2b, are assembled. By assembling rotors 2a and cam rings 2b of equal rank, the clearance between the rotor 2a and the cam ring 2b can be optimized.

A method of measuring the thickness dimension of the work piece 2 and a method of evaluating the dimensional precision will now be described in detail. It should be noted that dimension measurement and dimensional precision evaluation of the work piece 2 are performed automatically by a controller 18 installed in the dimension measuring apparatus 1.

As described above, the reference temperature and reference dimension of the master 16 are measured periodically.

The rotor 2a and cam ring 2b serving as measurement subjects are set in the dimension measurement portion 15 such that the axial center thereof is oriented in a vertical direction.

A displacement meter (not shown) is brought into contact with eight points on each of the upper surface and lower surface of the rotor 2a and cam ring 2b, and the thickness of the rotor 2a and cam ring 2b is measured by measuring the displacement at each point relative to the reference dimension of the master 16. It should be noted that the rotor 2a and cam ring 2b are positioned in the dimension measurement portion 15 such that the eight measured points are located identically every time.

Ranking according to dimensional precision may be performed using an average value or the like of the displacement at the eight points, but is preferably performed on the basis of the thinnest location of the eight points. The reason for this is that when the thickness of the work piece 2 is equal to or higher than a plus side allowable tolerance, the work piece 2 can be reworked through re-polishing, but when the thickness of the work piece is equal to or lower than a minus side allowable tolerance, the work piece 2 must be discarded, and therefore, by determining the dimensional precision on the basis of the thinnest location, the dimensional precision of the work piece 2 can be determined more strictly.

When a temperature difference exists between the temperature of the work piece 2 during measurement of the thickness of the work piece 2 and the reference temperature of the master 16, the work piece 2 expands/contracts by an amount corresponding to the temperature difference, and therefore the dimensional precision of the work piece 2 cannot be evaluated accurately.

Therefore, the measured dimension of the work piece 2 is corrected to the dimension at the reference temperature of the master 16. Expansion/contraction of the work piece 2 is determined according to the linear expansion coefficient of the work piece 2, the thickness of the work piece 2, and the temperature difference with the reference temperature of the master 16, and therefore a displacement S of the work piece 2 relative to the reference dimension of the master 16 is calculated using the following Equation (1).

$$S[\mu m] = S_0 + (T_m \times t_m \times \alpha_m - T_w \times t_w \times \alpha_w) \quad (1)$$

$S_0$ [μm]: measured displacement of work piece 2
$T_m$ [° C.]: temperature of master 16 (reference temperature)
$t_m$ [μm]: thickness of master 16 (reference dimension)
$\alpha_m$ [1/° C.]: linear expansion coefficient of master 16
$T_w$ [° C.]: temperature of work piece 2
$t_w$ [μm]: thickness of work piece 2
$\alpha_w$ [1/° C.]: linear expansion coefficient of work piece 2

Using Equation (1), the displacement $S_0$ of the work piece 2 measured by the dimension measurement portion 15 is corrected to a corrected displacement S at the reference temperature of the master 16. It should be noted that in Equation (1), the temperature $T_m$ of the master 16 employs the periodically measured value which is not always constant, and therefore an unvarying reference temperature of the master 16 may be determined and correct the temperature $T_m$ of the master 16 using the unvarying reference temperature.

The calculated corrected displacement S is the displacement relative to the reference dimension of the master 16, or in other words the dimension difference between the thickness of the work piece 2 and the reference dimension (thickness) of the master 16, and takes a value that is not affected by the temperature of the work piece 2. Therefore, an evaluation of the dimensional precision based on the value of the corrected displacement S, or in other words dimensional precision ranking, produces an accurate result.

In Equation (1), the thickness $t_w$ of the work piece 2 and the thickness $t_m$ of the master 16 take substantially equal values, as do the linear expansion coefficient $\alpha_w$ of the work piece 2 and the linear expansion coefficient $\alpha_m$ of the master 16, and therefore, in order to correct the expansion/contraction amount of the work piece 2 caused by the temperature difference between the work piece 2 and master 16, the corrected displacement S may be calculated simply on the basis of the difference between the measured temperature of the work piece 2 and the reference temperature of the master 16, as shown in the following Equation (2).

$$S = S_0 + (T_m - T_w) \times t_m \times \alpha_m \quad (2)$$

Thus, the dimension of the work piece 2 is measured and the dimensional precision of the work piece 2 is evaluated.

When measuring displacement at the eight points of the work piece 2 in the dimension measurement portion 15, the controller 18 also measures the flatness and parallelism of the work piece 2.

As regards the flatness, a lower plane of the work piece 2 is defined by eight points on a lower surface of the work piece 2, whereupon the flatness of an upper plane is measured at eight points on an upper surface of the work piece 2.

As regards the parallelism, the upper plane and lower plane are defined by eight points on each of the upper surface and lower surface of the work piece 2, whereupon the parallelism of the lower plane relative to the upper plane and the parallelism of the upper plane relative to the lower plane are measured.

In the above description, the displacement, i.e. the dimension difference between the work piece 2 and the master 16, is measured in the dimension measurement portion 15, the displacement is corrected on the basis of the temperature difference between the two, and then the dimensional precision of the work piece 2 is evaluated on the basis of the corrected displacement. However, a constitution whereby the dimension (thickness) of the work piece 2 is measured in the dimension measurement portion 15, the measured dimension is corrected on the basis of the temperature difference with the reference temperature of the master 16, and the dimensional precision of the work piece 2 is evaluated by comparing the corrected measured dimension and the reference dimension (thickness) of the master 16 may be employed.

Further, the measured dimension of the work piece 2 does not necessarily have to be corrected on the basis of the temperature difference with the reference temperature which is set by measuring the temperature of the master 16, and instead, a predetermined temperature may be set as the reference temperature such that the measured dimension of the work piece 2 is corrected on the basis of a temperature difference with this reference temperature.

Further, the dimensional precision of the work piece 2 does not necessarily have to be evaluated on the basis of the dimension difference with the reference dimension which is set by measuring the dimension of the master 16, and instead, a predetermined dimension may be set as a reference dimension such that the dimensional precision of the work piece 2 is evaluated on the basis of a dimension difference with this reference dimension.

The embodiment described above exhibits the following effects.

When a clearance in the thickness of the rotor 2a and cam ring 2b of a vane pump is large, the efficiency of the vane pump deteriorates, and when the clearance is small, seizing may occur. Hence, the rotor 2a and cam ring 2b require a high degree of dimensional precision. The dimension of the work piece 2 is corrected to the dimension at the reference temperature of the master 16, resulting in a value that is not affected by the temperature of the work piece 2, and therefore the dimensional precision of the work piece 2 can be evaluated accurately.

In other words, in this embodiment the dimensional precision of the work piece 2 is evaluated such that the work piece 2 is ranked from the rank A to the rank D on the basis of the difference with the reference dimension of the master 16, and this ranking is performed accurately.

Since ranking can be performed accurately, the degree to which the rotor 2a and cam ring 2b are suited to each other is improved when components of equal rank are assembled in a subsequent assembly process, and as a result, an improvement in the quality of the vane pump is achieved.

It goes without saying that this invention is not limited to the embodiment described above, and may be subjected to various modifications within the scope of the technical spirit thereof.

What is claimed is:
1. A dimension measuring apparatus which measures a dimension of a measurement subject, comprising:
   a conveying device which convey the measurement subject;
   a temperature controlling device which control a temperature in a conveyance region to which the measurement subject is conveyed;
   a dimension measuring device which measure the dimension of the measurement subject conveyed to a measurement portion in the conveyance region; and
   a temperature measuring device which measure a temperature of the measurement subject during dimension measurement by the dimension measuring device,
   wherein the dimension of the measurement subject measured by the dimension measuring device is corrected to a dimension at a predetermined reference temperature using the temperature measured by the temperature measuring device.

2. The dimension measuring apparatus as defined in claim 1, wherein a dimensional precision of the measurement subject is evaluated on the basis of a dimension difference between the corrected dimension and a predetermined reference dimension.

3. The dimension measuring apparatus as defined in claim 2, further comprising a reference material disposed in the measurement portion,
   wherein the reference temperature is set by measuring the temperature of the reference material, and
   the reference dimension is set by measuring the dimension of the reference material during measurement of the reference temperature of the reference material.

4. The dimension measuring apparatus as defined in claim 3, wherein the dimension measuring device are a displacement meter which measures a dimension difference between the measurement subject and the reference dimension of the reference material,
   a displacement measured by the displacement meter is corrected to a displacement at the reference temperature of the reference material using the temperature measured by the temperature measuring device, and
   the dimensional precision of the measurement subject is evaluated on the basis of the corrected displacement.

5. The dimension measuring apparatus as defined in claim 3, wherein the reference temperature and the reference dimension are measured when a predetermined time period has elapsed following measurement of the reference material or when a temperature difference between the temperature of the measurement subject measured by the temperature measuring device and the reference temperature reaches or exceeds a predetermined value.

6. The dimension measuring apparatus as defined in claim 1, wherein the conveyance region is divided into a first region in which the measurement subject is forcibly cooled and a second region in which the temperature of the measurement subject cooled in the first region is harmonized.

7. A dimension measuring method for measuring a dimension of a measurement subject, comprising:
   a temperature controlling step for controlling a temperature in a conveyance region to which the measurement subject is conveyed;
   a dimension measuring step for measuring the dimension of the measurement subject conveyed to a measurement portion in the conveyance region;
   a temperature measuring step for measuring a temperature of the measurement subject during dimension measurement in the dimension measuring step; and
   a correcting step for correcting the dimension of the measurement subject measured in the dimension measuring step to a dimension at a predetermined reference temperature using the temperature measured in the temperature measuring step.

8. The dimension measuring method as defined in claim 7, further comprising an evaluating step for evaluating a dimensional precision of the measurement subject on the basis of a dimension difference between the corrected dimension and a predetermined reference dimension.

9. The dimension measuring method as defined in claim 8, wherein the reference temperature is set by measuring the temperature of a reference material disposed in the measurement portion, and
   the reference dimension is set by measuring the dimension of the reference material during measurement of the reference temperature of the reference material.

* * * * *